(12) United States Patent
Fukino

(10) Patent No.: US 7,982,981 B2
(45) Date of Patent: Jul. 19, 2011

(54) LENS BARREL AND IMAGE CAPTURING APPARATUS

(75) Inventor: Kunihiro Fukino, Fujisawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/712,725

(22) Filed: Feb. 25, 2010

(65) Prior Publication Data

US 2010/0220403 A1   Sep. 2, 2010

(30) Foreign Application Priority Data

Feb. 27, 2009   (JP) .................................. 2009-045082

(51) Int. Cl.
*G02B 7/02*   (2006.01)
*G02B 15/14*   (2006.01)

(52) U.S. Cl. ........................ 359/823; 359/822; 359/694

(58) Field of Classification Search .......... 359/694–704, 359/811–824

See application file for complete search history.

(56) References Cited

U.S. PATENT DOCUMENTS

| 4,534,624 | A | * | 8/1985 | Toda et al. | .................... | 359/696 |
| 5,717,528 | A | * | 2/1998 | Ihara et al. | .................... | 359/694 |
| 7,423,823 | B2 | * | 9/2008 | Naganuma et al. | ........... | 359/820 |

FOREIGN PATENT DOCUMENTS

JP    2000-089086 A    3/2000

* cited by examiner

Primary Examiner — Mohammed Hasan
(74) Attorney, Agent, or Firm — Oliff & Berridge, PLC

(57) ABSTRACT

Provided is a lens barrel comprising a cylinder that is provided on a base and that extends in a direction of the axis of the cylinder; a guide axle that slides in the direction of the axis of the cylinder along an inner peripheral surface of the cylinder; a first holding component that holds a first lens and is fixed to the guide axle; and a second holding component that holds a second lens, which is different from the first lens, and slides in the direction of the axis of the cylinder along an outer peripheral surface of the cylinder.

16 Claims, 9 Drawing Sheets

LENS BARREL AND IMAGE CAPTURING APPARATUS

BACKGROUND

1. Technical Field

The present invention relates to a lens barrel and an image capturing apparatus. In particular, the present invention relates to a lens barrel having a plurality of lenses and an image capturing apparatus provided with the lens barrel.

The present application claims priority from Japanese Patent Application No. 2009-45082 filed on Feb. 27, 2009, the contents of which are incorporated herein by reference.

2. Related Art

A conventional lens barrel of a camera is provided with a fixed cylinder that is fixed to an image capturing unit when mounted on the image capturing unit, a cam cylinder that rotates relative to the fixed cylinder, and a plurality of lenses that move in a direction of the optical axis according to the rotation of the cam cylinder, as disclosed in Japanese Patent Application Publication No. 2000-89086, for example.

This lens barrel, however, has various design restrictions that are necessary for ensuring optical capability. Furthermore, in order to ensure these optical capabilities while complying with the design restrictions, the internal configuration of the lens barrel should be as simple as possible.

SUMMARY

According to a first aspect related to the innovations herein, one exemplary a lens barrel may comprise a cylinder that is provided on a base and that extends in a direction of the axis of the cylinder; a guide axle that slides in the direction of the axis of the cylinder along an inner peripheral surface of the cylinder; a first holding component that holds a first lens and is fixed to the guide axle; and a second holding component that holds a second lens, which is different from the first lens, and slides in the direction of the axis of the cylinder along an outer peripheral surface of the cylinder.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

The following describes a camera according to a first embodiment of the present invention and a lens barrel used by this camera, with reference to FIGS. 1 to 7.

Figure 1:
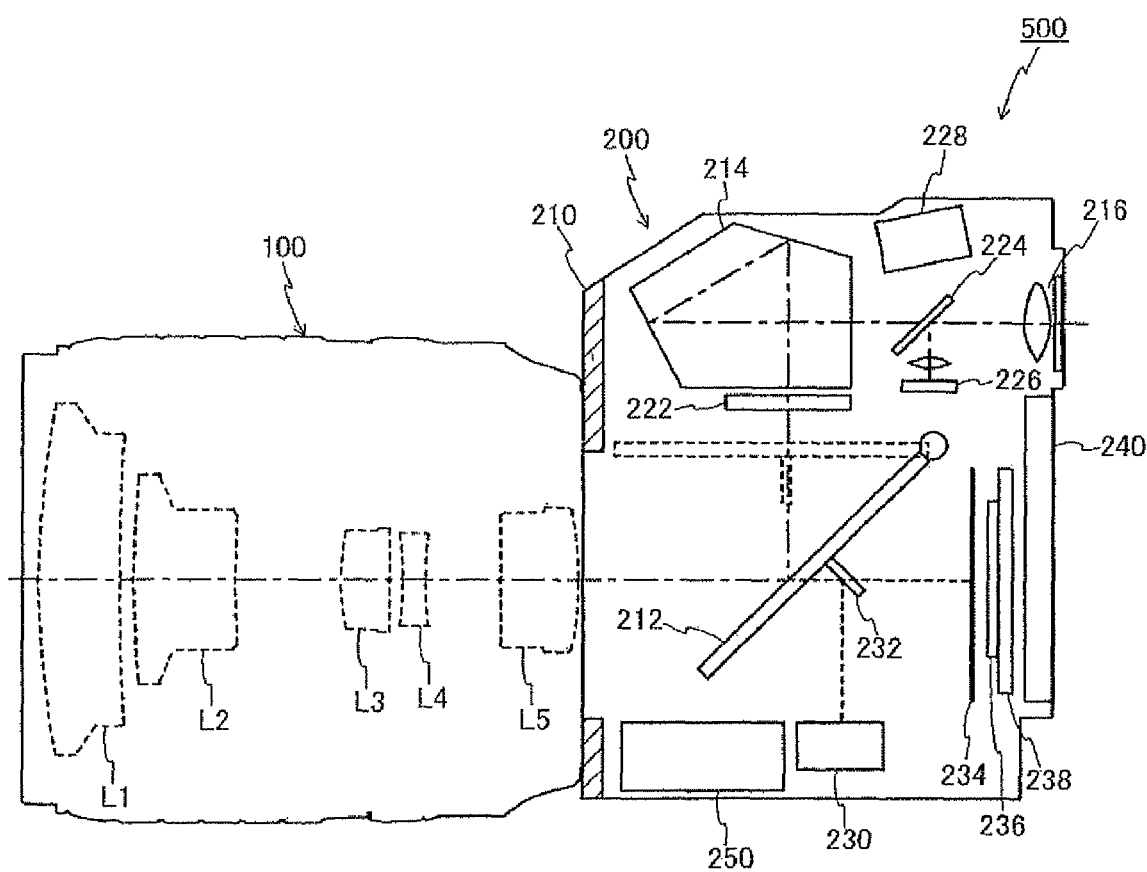
FIG. 1 is a schematic view of the camera according to the first embodiment.

FIG. 1 is a schematic view of the camera 500 according to the first embodiment. The camera 500 includes an image capturing unit 200 and a lens barrel 100.

The image capturing unit 200 includes a case 210, an optical system, a focal point detection apparatus 230, a shutter 234, an image capturing element 238, a main LCD 240, and a main control section 250. The optical system includes a main mirror 212, a pentaprism 214, and an ocular optical system 216 housed in the case 210.

When in the state shown in FIG. 1, the main mirror 212 guides the majority of incident light from the lens barrel 100 to a focusing screen 222 arranged thereabove. The focusing screen 222 is arranged at a focal position of the optical system in the lens barrel 100, and focuses the image formed by the optical system in the lens barrel 100.

A pentaprism 214 guides the image formed by the focusing screen 222 to the ocular optical system 216 via the half mirror 224, after the image is reflected. In this way, the image on the focusing screen 222 can be viewed as a normal image through the ocular optical system 216. In this case, the half mirror 224 superimposes a display image indicating image capturing conditions, setting conditions, and the like formed by the finder LCD 226 onto the image of the focusing screen 222. Accordingly, the image seen at the output end of the ocular optical system 216 is a combination of the image of the focusing screen 222 and the image of the finder LCD 226. A portion of the light output from the pentaprism 214 is guided to the photometric unit 228, and the photometric unit 228 measures the intensity of the incident light, the distribution of this intensity, or the like.

The focal point detection apparatus 230 detects a focal adjustment state, i.e. a focus state, of the optical system in the lens barrel 100 based on the light that is passed through the main mirror 212 and reflected by the secondary mirror 232 provided on the back of the main mirror 212. During image capturing, the main mirror 212 and the secondary mirror 232 are raised to the position shown by the dotted line in FIG. 1 to be removed from the optical path of the incident light from the lens barrel 100.

The shutter 234 is arranged behind the main mirror 212, where "behind" refers to a position further along the optical path of the incident light from the lens barrel 100. During image capturing, the shutter 234 opens in conjunction with the raising of the main mirror 212 and the secondary mirror 232. When the shutter 234 is in the open state, the incident light from the lens barrel 100 is incident to the image capturing element 238 via the optical filter 236. The image capturing element 238 converts the image formed by the incident light into an electric signal.

The main LCD 240 has a display screen portion that is exposed to the outside of the case 210. This display screen portion of the main LCD 240 displays, in addition to the image formed on the image capturing element 238, i.e. the captured image, various types of setting information or the like concerning the image capturing unit 200.

The main control section 250 controls the operation of the various components described above. The main control section 250 also performs auto-focus, which involves referencing the information concerning the focal adjustment state of the optical system detected by the focal point detection apparatus 230 in the image capturing unit 200 to drive the first through fifth lens groups L1 to L5 of the optical system in the lens barrel 100, and focus-aid, which involves referencing the movement amount of the optical system in the lens barrel 100 and displaying information concerning the focus on the finder LCD 226.

The following is a detailed description of the configuration of the lens barrel 100 referencing FIGS. 2 to 5B.

Figure 2:
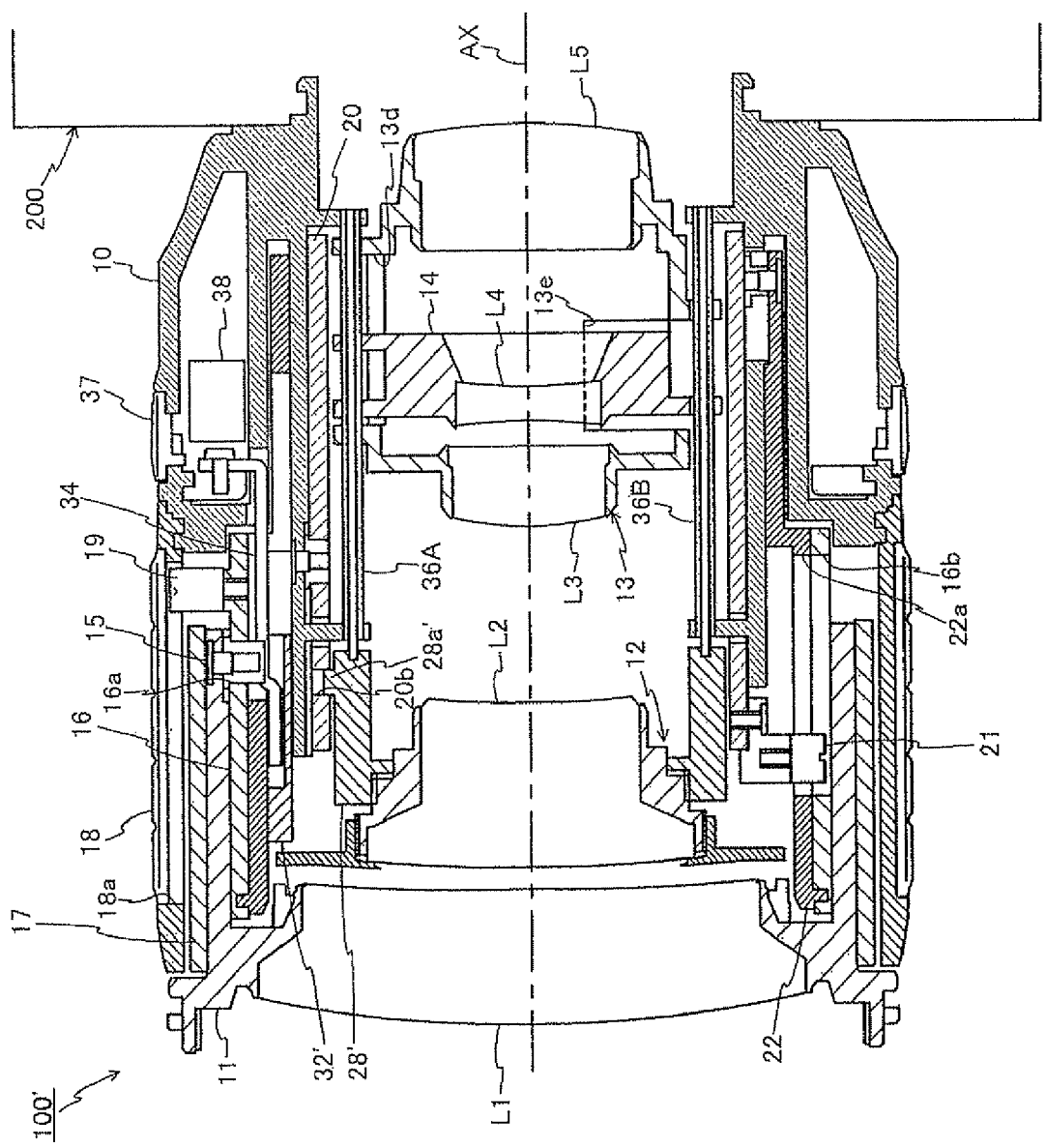
FIG. 2 shows the lens barrel in a wide angle state.
Figure 3:
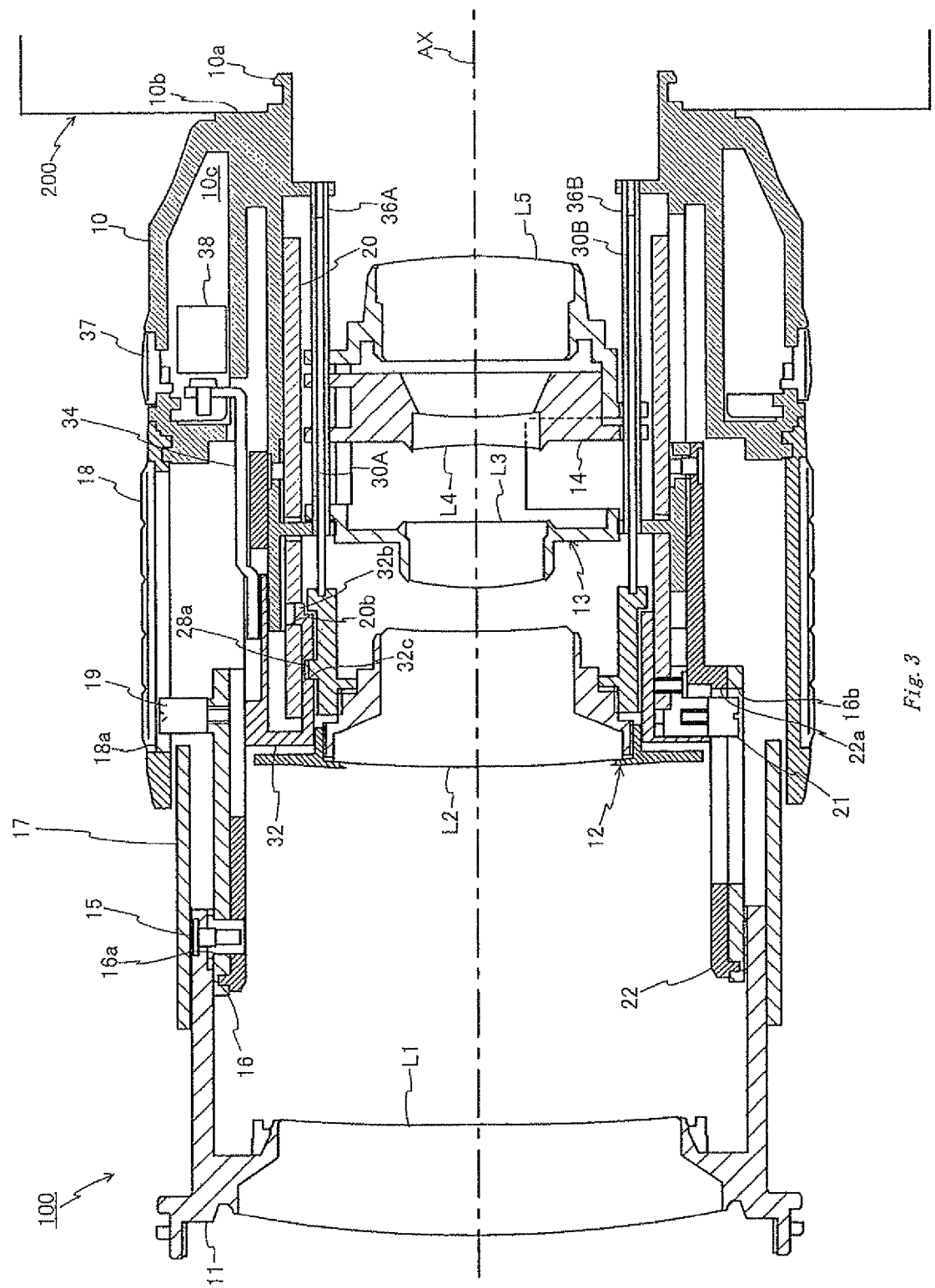
FIG. 3 shows the lens barrel zoomed to a telephoto state.

FIGS. 2 and 3 show cross-sectional views of the lens barrel 100. FIG. 2 shows the lens barrel 100 in a wide angle state and FIG. 3 shows the lens barrel 100 zoomed to a telephoto state. As shown in FIGS. 2 and 3, the lens barrel 100 includes first through fifth lens groups L1, L2, L3, L4, and L5 arranged on a common optical axis AX. In the following description, the position of the first lens group L1 is referred to as being at the "front" or "forward" side of the optical axis AX, and the position of the fifth lens group L5 is referred to as being at the "rear" or "back" side of the optical axis AX.

As shown in FIGS. 1 and 2, the lens barrel 100 includes a fixed cylinder 10, a first lens group sliding cylinder 11 that holds the first lens group L1, a second lens group sliding cylinder 12 that holds the second lens group L2, a third and fifth lens group sliding cylinder 13 that holds third and fifth lens groups L3 and L5, and a fourth lens group sliding cylinder 14 that holds the fourth lens group L4.

The fixed cylinder 10 is fixed to the image capturing unit 200 by the base 10a. In this fixed state, the end surface 10b on the image capturing unit 200 side of the fixed cylinder 10 closely contacts the image capturing unit 200, i.e. the case 210 in FIG. 1, such that the fixed cylinder 10 is fixed to the image capturing unit 200, thereby determining the position of the lens barrel 100 relative to the image capturing unit 200. The fixed cylinder 10 supports a guide pipe 36A near a top of the internal peripheral surface thereof, i.e. a ceiling portion, and supports a guide pipe 36B near a bottom of the internal peripheral surface thereof.

The first lens group sliding cylinder 11 is movably connected to a zoom drive cylinder 16 arranged on an inner side of the first lens group sliding cylinder 11. More specifically, a cam pin 15 provided on the first lens group sliding cylinder 11 is engaged with a can groove 16a formed on the zoom drive cylinder 16.

The zoom drive cylinder 16 is movably connected to a zoom operation ring 18 that rotates around the optical axis AX along the outermost periphery of the lens barrel 100. More specifically, a drive force transmitting pin 19 protruding outward from the zoom drive cylinder 16 is engaged with a operation groove 18a that is formed on the inner surface of the zoom operation ring 18 and parallel to the optical axis AX. As a result, the zoom drive cylinder 16 rotates in response to the rotation of the zoom operation ring 18. The zoom operation ring 18 has a rubber layer to stop slippage formed on the outer peripheral surface thereof, so that that zoom operation ring 18 does not move to the front or rear. During the scaling operation, i.e. zooming, the zoom operation ring 18 is rotated by a user.

The zoom drive cylinder 16 can rotate relative to a zoom guide cylinder 22 provided on an inner side thereof. As shown in the bottom half of FIGS. 2 and 3, the zoom guide cylinder 22 has a recessed groove 22a passing therethrough, and a rotation connecting member 21 fixed to the cam ring 20 provided on the inner side of the fixed cylinder 10 is engaged with the zoom guide cylinder 22 and the linear groove 16b passing through the zoom drive cylinder 16. The cam ring 20 has a cam groove 20e that engages with a cam pin 10d protruding from an inner side of the fixed cylinder 10.

With the above configuration, when the zoom operation ring 18 is rotated, the zoom drive cylinder 16 rotates in response to the action of the drive force transmitting pin 19 and, as a result of this rotation and the cam pin 15, the first lens group sliding cylinder 11 moves backward and forward, i.e. in a direction along the optical axis AX. Furthermore, when the zoom drive cylinder 16 rotates due to the rotation of the zoom operation ring 18, this rotational force is transmitted to the earn ring 20 via the rotation connecting member 21, and therefore the cam ring 20 moves backward and forward while rotating. The zoom guide cylinder 22 moves backward and forward together with the zoom drive cylinder 16 without rotating.

A cover cylinder 17 is provided between the zoom operation ring 18 and the first lens group sliding cylinder 11. As shown in FIGS. 2 and 3, the cover cylinder 17 moves backward and forward together with the first lens group sliding cylinder 11 and seals the space between the zoom operation ring 18 and the first lens group sliding cylinder 11, thereby preventing dust from entering into the lens barrel 100.

Figure 4A:
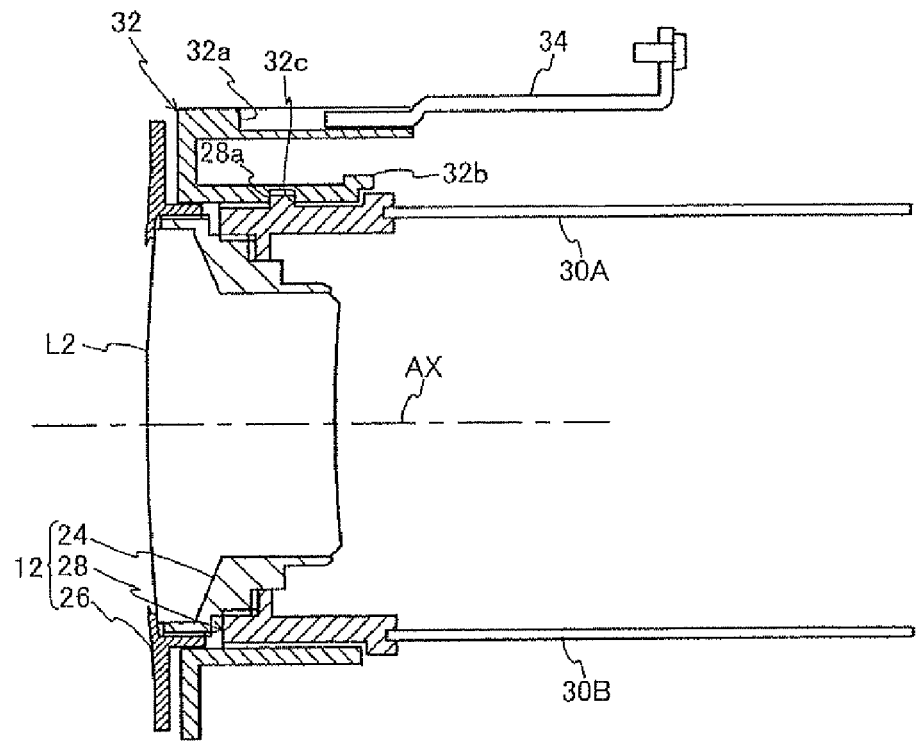
FIG. 4A is a close-up view of the second lens group sliding cylinder and the surrounding area.

FIG. 4A is a close-up view of the second lens group sliding cylinder 12 and the surrounding area. As shown in FIG. 4A, the second lens group sliding cylinder 12 includes a holding cylinder 24 that holds the second lens group L2, a pressing ring 26 fixed to the holding cylinder 24, and an engaging cylinder 28 that is provided to surround the outer periphery of the holding cylinder 24. The holding cylinder 24 and the pressing ring 26 are fixed by a screw clamp or the like, and grip the outer border of the second lens group L2.

The engaging cylinder 28 supports two guide bars 30A and 30B. The guide bars 30A and 30B are arranged symmetrically at top and bottom positions across the optical axis AX. As shown in FIGS. 2 and 3, the guide bar 30A is slidably inserted into the guide pipe 36A supported by the fixed cylinder 10, and the guide bar 30B is slidably inserted into the guide pipe 36B supported by the fixed cylinder 10. There need not be complete contact between the guide bars 30A and 30B and the guide pipes 36A and 36B, and contact is only necessary at regions near the ends of the guide pipes 36A and 36B.

The material of the guide bars 30A and 30B is a strong and light-weight material, such as steel, and the space between (i) the guide bars 30A and 30B and (ii) the engaging cylinder 28 is fixed using a process such as adhesion or pressurizing. The material of the guide pipes 36A and 3613 may be the same as that of the guide bars 30A and 30B, e.g. steel. Here, the guide pipes 36A and 36B have diameters of approximately 2 to 3 mm and thicknesses (the difference between the internal and external diameters) of approximately 0.3 to 0.4 mm. In the present example, the internal diameter of the guide pipe 36A and the external diameter of the guide bar 30A are practically the same. The inner diameter of the guide pipe 36B is somewhat greater than that of the guide pipe 36A to provide a small space between the guide pipe 36B and the guide bar 30B. By ensuring a space between the guide pipe 36B and the guide bar 30B, it is possible to allow for a manufacturing error (gutter) in the space between the guide bars 30A and 30B.

Returning to FIG. 4A, a protruding follower 28a is formed on a portion of the outer peripheral surface of the engaging cylinder 28. The follower 28a engages with the circumferential groove 32c of the interlocking ring 32 provided on the outer side of the engaging cylinder 28. The follower 28a is arranged near the guide bar 30A, specifically, near an axis extending from the guide bar 30A.

An interlocking groove 32a and a cam follower 32b are further formed on the interlocking ring 32 on which the circumferential groove 32c is formed. One end of an interlocking key 34, which is substantially L-shaped, engages with the interlocking groove 32a. The interlocking key 34 is connected to the focus ring 37 provided on the outer periphery of the fixed cylinder 10, as shown in FIGS. 2 and 3, and moves rotationally around the optical axis AX according to the rotation of the focus ring 37 around the optical axis AX. When the interlocking key 34 moves rotationally around the optical axis AX in this way, the interlocking ring 32 rotates around the optical axis AX. Furthermore, the interlocking key 34 is connected to the motor 38 provided in the motor chamber 10c of the fixed cylinder 10. Accordingly, the interlocking ring 32 also rotates around the optical axis AX according to the rotational movement of the interlocking key 34 around the optical axis AX caused by the rotational performance of the motor 38.

As shown in FIGS. 2 and 3, the earn follower 32b engages with the cam groove 20b formed on the cam ring 20. Accordingly, when the interlocking ring 32 rotates, the interlocking ring 32 and the components connected to the interlocking ring 32 (the second lens group sliding cylinder 12, the guide bars 30A and 30B, and the second lens group L2) move backward and forward due to the cam groove 20b and the cam follower 32b. In this backward and forward movement, the interlocking ring 32 moves backward and forward while rotating around the optical axis AX, but the movement of the guide bars 30A and 30B is restricted to only backward and forward movement by the guide pipes 36A and 36B, and so the second lens group sliding cylinder 12 and the second lens group L2 connected to the guide bars 30A and 30B move backward and forward without rotating. The cam follower 32b is arranged near the guide bar 30A, specifically, near an extended axis of the guide bar 30A.

Figure 4B:
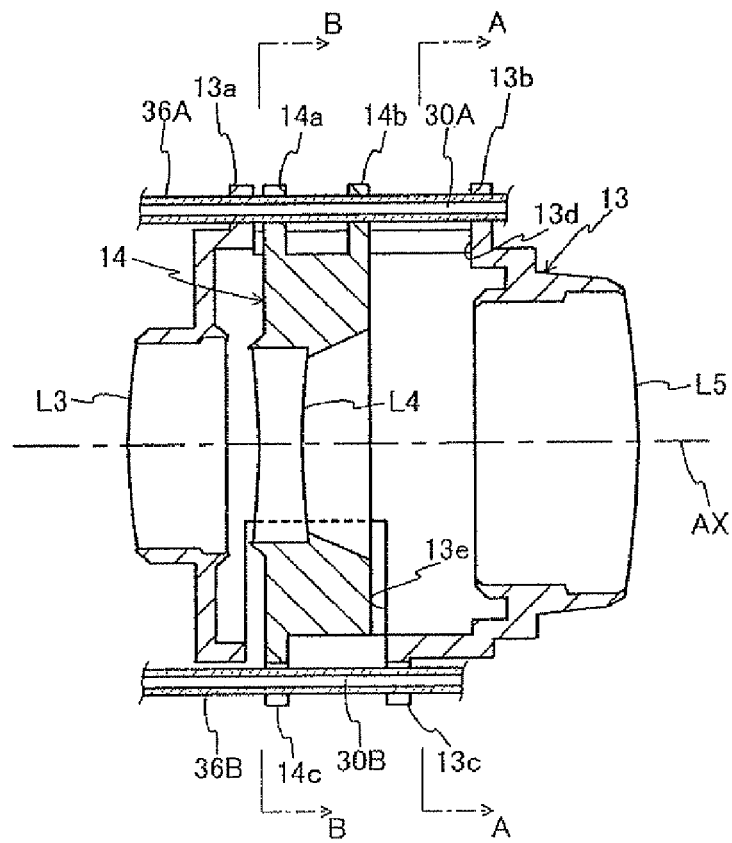
FIG. 4B is a close-up view of the third and fifth lens group sliding cylinder, the fourth lens group sliding cylinder, and the surrounding area.

FIG. 4B is a close-up view of the third and fifth lens group sliding cylinder 13, the fourth lens group sliding cylinder 14, and the surrounding area. As shown in FIG. 4B the third and fifth lens group sliding cylinder 13 holds the third lens group L3 and the fifth lens group L5 on the optical axis AX with a prescribed interval therebetween. The third and fifth lens group sliding cylinder 13 includes two engaging members 13a and 13b that engage with the guide pipe 36A and one engaging member 13e that engages with the guide pipe 368.

Figure 5A:
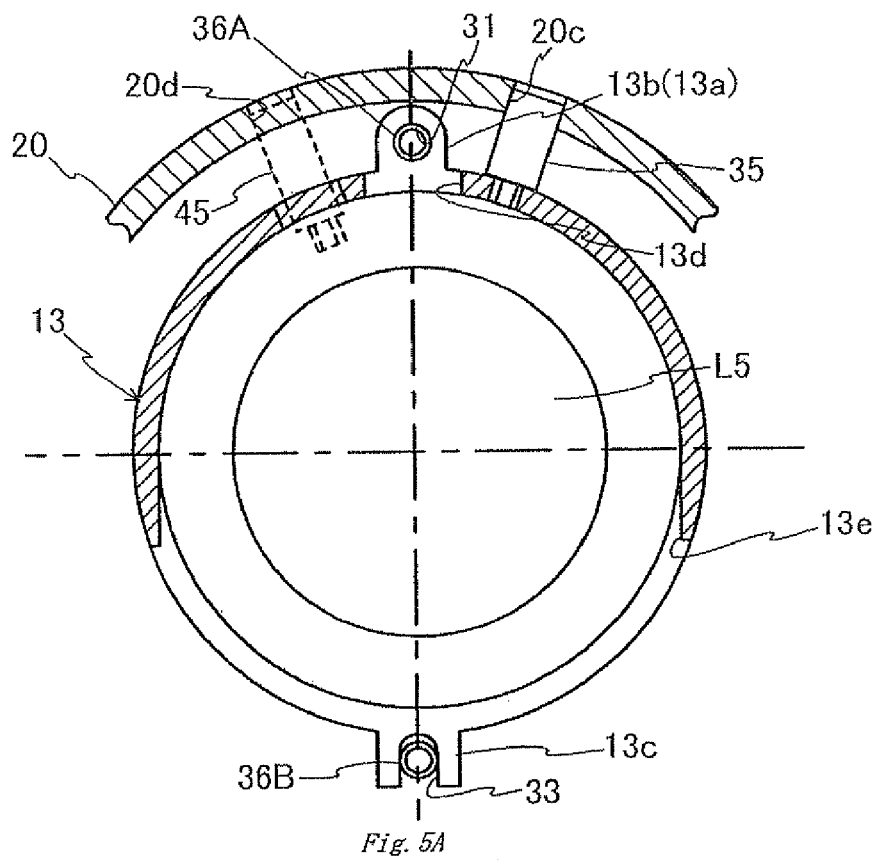
FIG. 5A is a cross-section along the line A-A of FIG. 4B.

The engaging member 13b (and 13a) has a circular through-hole 31, as shown in FIG. 5A, which is a cross-section along the line A-A of FIG. 4B. The through-hole 31 has about the same diameter as the guide pipe 36A, and when the guide pipe 36A is inserted through the through-hole 31, the weight of the third and fifth lens group sliding cylinder 13 is supported by the guide pipe 36A. Here, "about the same diameter" means that the dimensions of the through-hole 31 are such that a gap sufficient to prevent interference with sliding of the third and fifth lens group sliding cylinder 13 is created between the guide pipe 36A and the through-hole 31. The engaging member 13c has a U-shaped groove 33. The width of the U-shaped groove 33 is substantially equal to the diameter of the guide pipe 36B, specifically, the dimensions of the U-shaped groove 33 are such that a gap sufficient to prevent interference with sliding of the third and fifth lens group sliding cylinder 13 is created. By engaging the guide pipe 36B with the U-shaped groove 33, the rotational movement of the third and fifth lens group sliding cylinder 13 around the guide pipe 36A is prevented. Instead of the U-shaped groove 33, the engaging member 13c may have an elongated hole with a length in the upward and downward direction.

As shown in FIG. 5A, a cam follower 35 is formed to protrude from a portion of the outer periphery of the third and fifth lens group sliding cylinder 13. The cam follower 35 engages with the cam groove 20c formed on the cam ring 20. Therefore, when the cam ring 20 rotates around the optical axis AX, this rotation causes the third and fifth lens group sliding cylinder 13 to receive a drive force in the direction of the optical axis AX. The third and fifth lens group sliding cylinder 13 is engaged with the guide pipes 36A and 36B as described above, and so moves in the backward and forward direction without rotating around the optical axis AX. In FIGS. 4B, 2, and the like, the cam follower 35 and the cam groove 20c are not shown for the sake of convenience.

As shown in FIGS. 4B and 5A, an upper aperture 13d is formed on an upper portion of the third and fifth lens group sliding cylinder 13, and a lower aperture 13e is formed on a lower portion of the third and fifth lens group sliding cylinder 13.

As shown in FIG. 4B, the fourth lens group sliding cylinder 14 is provided in the internal space of the third and fifth lens group sliding cylinder 13. An upper portion of the fourth lens group sliding cylinder 14 is revealed through the upper aperture 13d of the third and fifth lens group sliding cylinder 13, and a lower portion of the fourth lens group sliding cylinder 14 is revealed through the lower aperture 13e of the third and fifth lens group sliding cylinder 13. As shown in FIG. 4B, engaging members 14a and 14b engaging with the guide pipe 36A are formed on the upper portion of the fourth lens group sliding cylinder 14, and an engaging member 14c engaging with the guide pipe 36B is formed on the lower portion of the fourth lens group sliding cylinder 14.

Figure 5B:
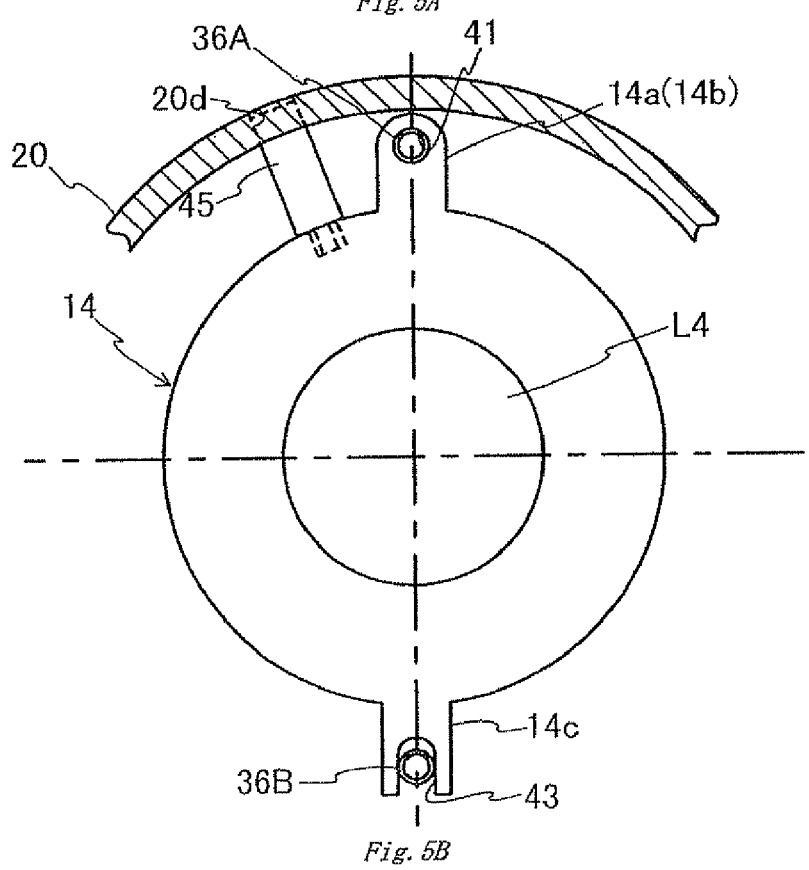
FIG. 5B is a cross-section along the line B-B of FIG. 4B.

The engaging member 14a (and 14b) has a circular through-hole 41, as shown in FIG. 5B, which is a cross-section along the line B-B of FIG. 4B. The through-hole 41 has about the same diameter as the guide pipe 36A, i.e. the diameter of the through-hole 41 is such that a gap sufficient to prevent interference with sliding of the fourth lens group sliding cylinder 14 is created, and when the guide pipe 36A is inserted through the through-hole 41, the weight of the fourth lens group sliding cylinder 14 is supported by the guide pipe 36A. The engaging member 14c has a U-shaped groove 43. The width of the U-shaped groove 43 is substantially equal to the diameter of the guide pipe 36B, specifically, the dimensions of the U-shaped groove 43 are such that a gap sufficient to prevent interference with sliding of the fourth lens group sliding cylinder 14 is created. By engaging the guide pipe 36B with the U-shaped groove 43, the rotational movement of the fourth lens group sliding cylinder 14 around the guide pipe 36A is prevented. Instead of the U-shaped groove 43, the engaging member 14c may have an elongated hole with a length in the upward and downward direction.

As shown in FIG. 5B, a cam follower 45 is formed to protrude from a portion of the outer periphery of the fourth lens group sliding cylinder 14. The cam follower 45 engages with the cam groove 20d (see FIG. 5A) formed on the cam ring 20. Therefore, when the cam ring 20 rotates around the optical axis AX, this rotation causes the fourth lens group sliding cylinder 14 to move in the direction of the optical axis AX. In this case, since the fourth lens group sliding cylinder 14 is engaged with the guide pipes 36A and 36B as described above, the fourth lens group sliding cylinder 14 moves in the backward and forward direction without rotating around the optical axis AX. In FIGS. 4B, 2, and the like, the cam follower 45 and the cam groove 20d are not shown for the sake of convenience.

As shown in FIG. 5A, the cam followers 35 and 45 are arranged near the guide pipe 36A. Here, "near the guide pipe 36A" refers to a region within 45 degrees of the guide pipe 36A. By arranging the cam followers 35 and 45 near the guide pipe 36A in this way, the force from the cam followers 35 and 45, i.e. the drive force in the backward and forward direction, is applied near the guide pipe 36A, and so the each sliding cylinder 13 and 14 is moved efficiently via the cam followers 35 and 45. If there were no design restrictions, the cam followers 35 and 45 would desirably be as close to the guide pipe 36A as possible.

The following describes the movement of the second through fifth lens groups L2 to L5 when the zoom operation is performed and when the focusing operation is performed, with reference to FIGS. 6 and 7. In FIGS. 6 and 7, to simplify the diagrams, the portion displaying the operation of the first lens group L1 is omitted.

First, the movement of each lens group during zooming is described with reference to FIGS. 6A and 6B. This example describes the zooming the lens barrel 100 from a wide angle state (FIG. 6A) to a telephoto state (FIG. 6B).

Figure 6A:
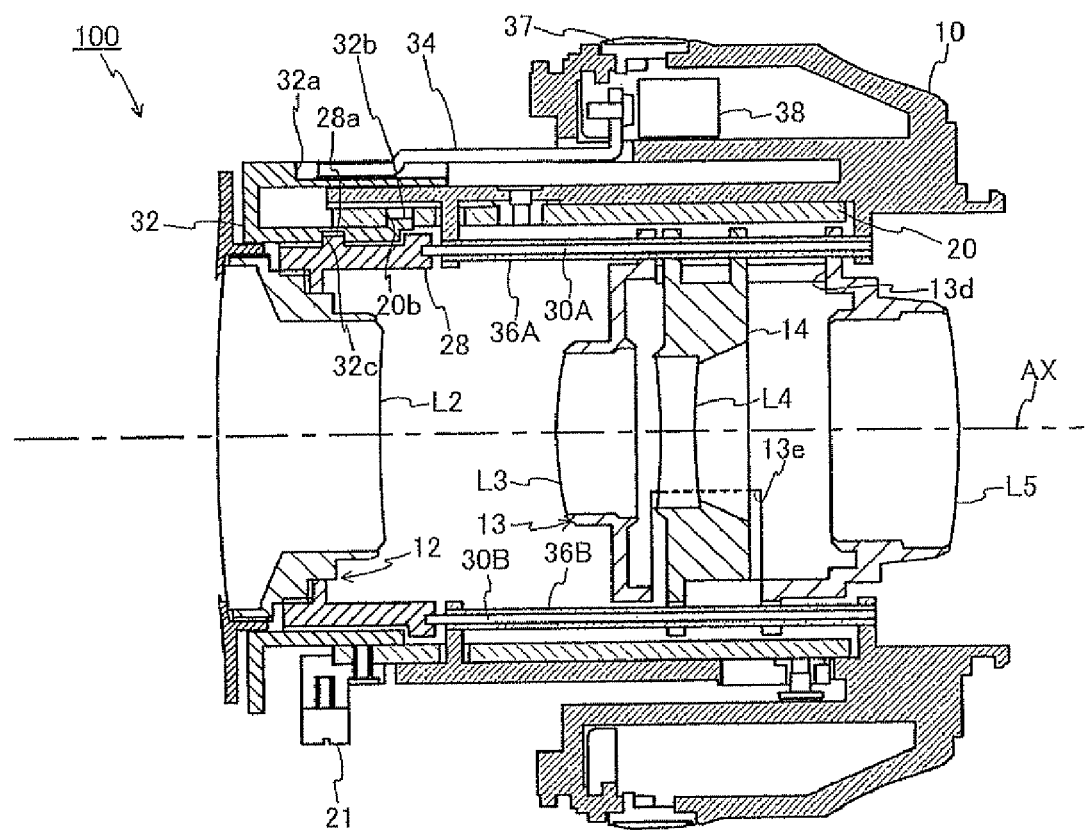
FIG. 6A is a diagram for describing the movement of each lens group during zooming.
Figure 6B:
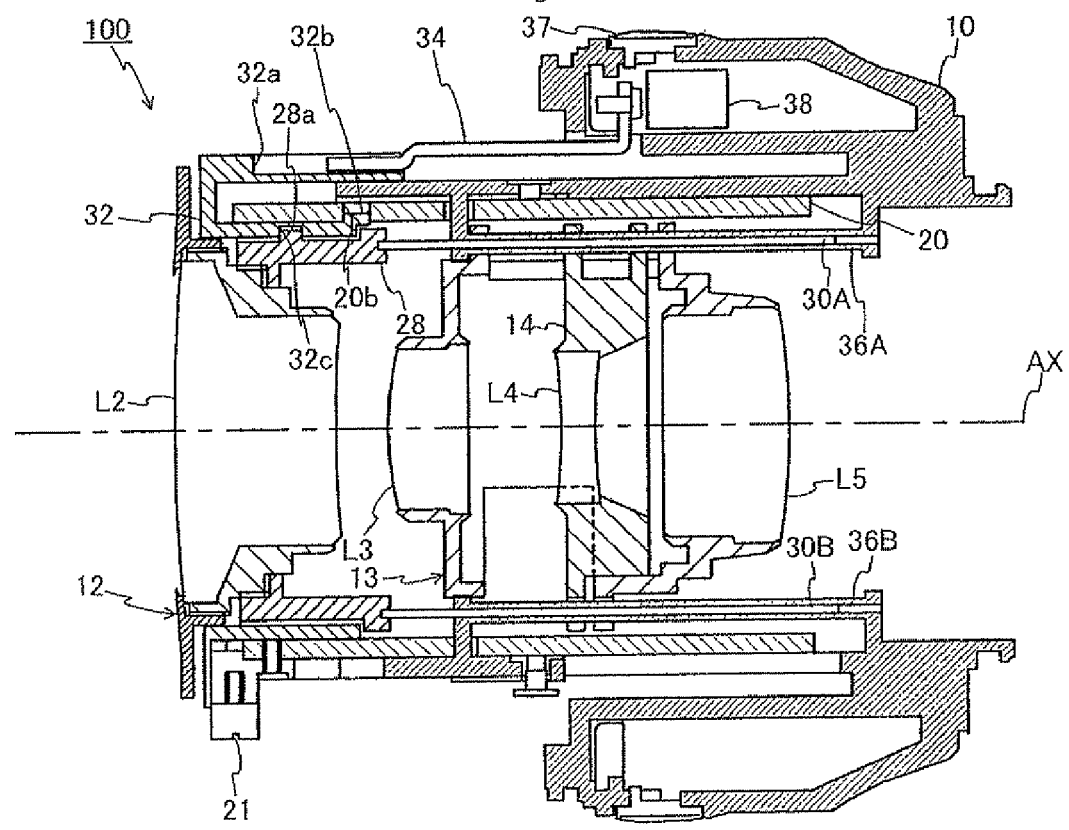
FIG. 6B is a diagram for describing the movement of each lens group during zooming.

From the state shown in FIG. 6A, when the zoom operation ring 18 (see FIG. 2) is rotated by a user, the cam ring 20 rotates via the rotation connecting member 21 and the like as described above. This rotation causes a rotational force and a backward and forward movement force to be applied to the interlocking ring 32 via the cam follower 32b, but the interlocking ring 32 is guided only in the backward and forward direction by the interlocking key 34 engaged with the interlocking groove 32a in a fixed state, and so the interlocking ring 32 moves forward without rotating. Furthermore, the forward movement of the interlocking ring 32 causes the engaging cylinder 28 engaged with the interlocking ring 32, the second lens group sliding cylinder 12, and the second lens group L2 to also move forward.

The rotation of the cam ring 20 also causes the third and fifth lens group sliding cylinder 13 and the fourth lens group sliding cylinder 14, which are engaged thereto via the cam followers 35 and 45, to move forward, thereby moving the lens groups L3 to L5 forward. The distances that the third and fifth lens groups L3 and L5 and the fourth lens group L4 move differ according to the formation direction (angle) of the cam grooves 20c and 20d engaged with the cam follower 35 and the cam follower 45. Since the cam ring 20 itself also moves forward, the actual distance moved by each of the third through fifth lens groups L3 to L5 is the sum of the distance moved by the cam ring 20 and the distance moved by the cam followers 35 and 45 due to the cam grooves 20c and 20d.

When zooming in this way, the rotation of the zoom operation ring 18 causes each of the second to fifth lens groups L2 to L5, and the first lens group L1 that is not included in the current description, to move forward individually by a certain distance (except for third and fifth lens groups L3 and L5, which both move the same distance).

Figure 7A:
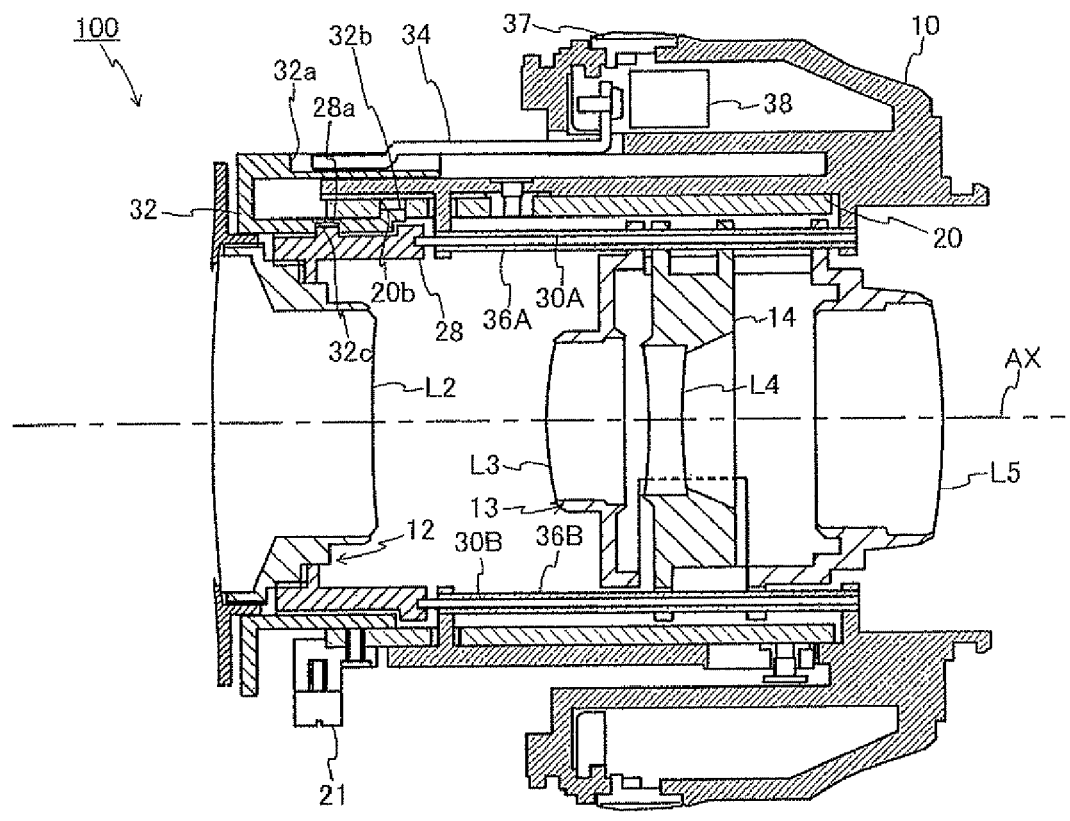
FIG. 7A is a diagram for describing the movement of each lens group during focusing.
Figure 7B:
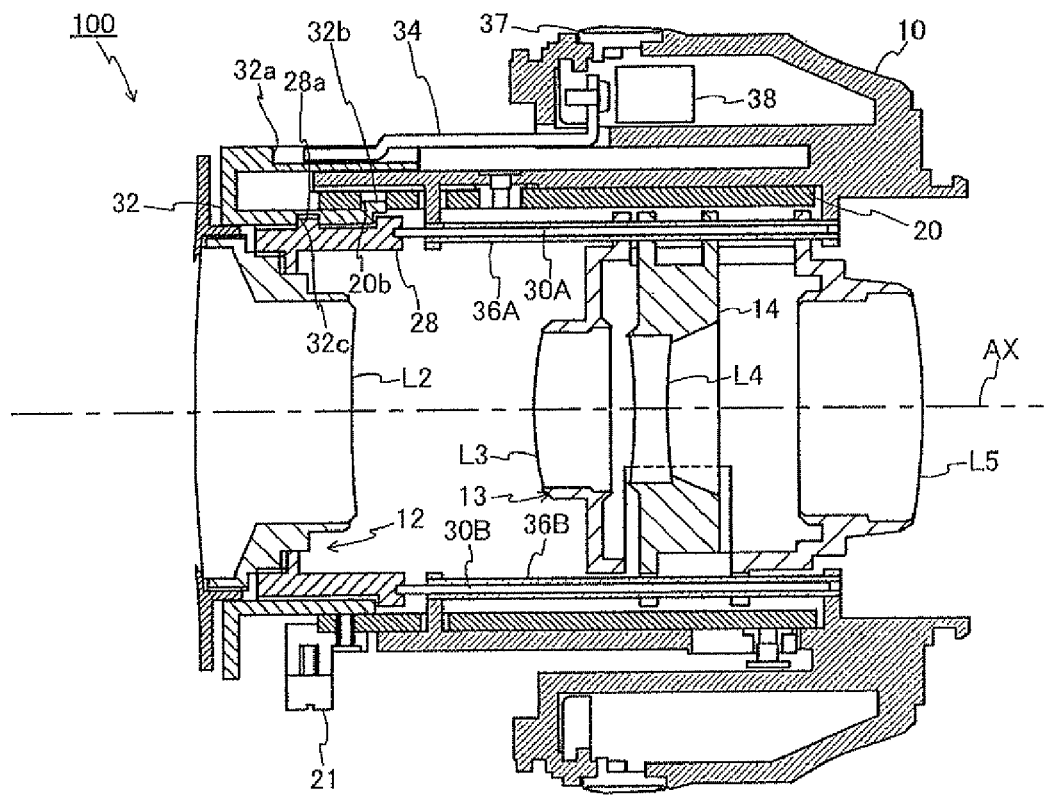
FIG. 7B is a diagram for describing the movement of each lens group during focusing.

The following describes the movement of each lens group when focusing, with reference to FIGS. 7A and 7B. Focusing is assumed to begin from the state shown in 7A, and proper focus is assumed to be reached at the state shown in FIG. 7B.

First, when the interlocking key 34 moves rotationally around the optical axis AX due to rotation of the focus ring 37 by the user or rotational drive from the motor 38, the interlocking ring 32 engaged with the interlocking key 34 rotates around the optical axis AX as described above. Due to this rotation, the interlocking ring 32 moves forward as the cam follower 32b follows the cam groove 20b of the cam ring 20. The forward and rotational movement of the interlocking ring 32 causes the engaging cylinder 28, which has the follower 28a engaged with the circumferential groove 32c of the interlocking ring 32, the second lens group sliding cylinder 12, and the second lens group L2 to move forward. Here, the cam follower 32b and the follower 28a are arranged near the guide bar 30A, and so the drive force in the direction of the optical axis AX is efficiently applied to the interlocking ring 32 and the engaging cylinder 28.

The cam ring 20 is in a fixed non-rotating state, and therefore the third and fifth lens groups L3 to L5 do not move forward or backward. Furthermore, the first lens group L1, which is not included in the present description, also does not move forward or backward.

When focusing in this way, the rotation of the interlocking key 34 causes only the second lens group L2 to move forward or backward. In this case, the third and fifth lens group sliding cylinder 13 and the fourth lens group sliding cylinder 14 are not directly contacting the guide bars 30A and 30B fixed to the second lens group sliding cylinder 12, and therefore the forward or backward motion of the second lens group sliding cylinder 12 is not impeded by the third and fifth lens group sliding cylinder 13 or the fourth lens group sliding cylinder 14.

The rotation of the motor 38 during focusing is controlled by the main control section 250 shown in FIG. 1 based on the detection result of the focal point detection apparatus 230. In other words, auto-focusing is performed by the main control section 250 controlling the rotation of the motor 38. Connection terminals provided between the lens barrel 100 and the image capturing unit 200 are used to provide an electrical connection therebetween, and therefore the image capturing unit 200 can supply power to the lens barrel 100, e.g. to the motor 38 or the like.

As described above, according to the first embodiment of the present invention, the guide bars 30A and 30B provided on the second lens group sliding cylinder 12 holding the second lens group L2 slide along the inner peripheral surface of the guide pipes 36A and 36B provided on the fixed cylinder 10 and extending in the direction of the optical axis AX, and the third and fifth lens group sliding cylinder 13 holding the lens groups L3 and L5 and the fourth lens group sliding cylinder 14 holding the fourth lens group L4 slide in the direction of the optical axis AX along the outer peripheral surface of the guide pipes 36A and 3613. As a result, the lens sliding cylinders 12, 13, and 14 can move along the same components. Therefore, the configuration inside the lens barrel 100 can be simplified. Furthermore, the third and fifth lens group sliding cylinder 13 and the fourth lens group sliding cylinder 14 do not contact the guide bars 30A and 30B provided on the second lens group sliding cylinder 12, and therefore, even when the second lens group sliding cylinder 12 moves independently during focusing or the like, the other sliding cylinders 13 and 14 do not obstruct the sliding of the guide bar 30A. Therefore, the force necessary for moving the second lens group sliding cylinder 12 can be decreased, and the burden placed on the motor 38 or on the user when rotating the focus ring 37 can be decreased.

Furthermore, according to the present embodiment, the cam follower 32b of the interlocking ring 32 engages with the cam groove 20b of the cam ring 20 and the follower 28a of the second lens group sliding cylinder 12 engages with the circumferential groove 32c of the interlocking ring 32, and so the cam ring 20 and the interlocking ring 32 are indirectly connected to each other. Therefore, when the cam ring 20 rotates while the position of the interlocking ring 32 in the rotational direction is fixed, the cam groove 20b and the cam follower 32b cause the interlocking ring 32 to rotate around the optical axis AX together with the second lens group sliding cylinder 12. Furthermore, when the interlocking ring 32 rotates while the position of the cam ring 20 in the rotational direction is fixed, the cam groove 20b and the cam follower 32b cause the interlocking ring 32 itself to move in the forward and backward direction, which causes the second lens group sliding cylinder 12 to also move in the forward and backward direction. In this way, in the embodiment of the present invention, the second lens group sliding cylinder 12 can be moved in the forward and backward direction by either the rotation of the cam ring 20 or the rotation of the interlocking ring 32.

Furthermore, in the present embodiment, the cam followers 35 and 45 formed on the sliding cylinders 13 and 14 are provided near the guide pipe 36A, and therefore the movement (drive) of the sliding cylinders 13 and 14 is achieved efficiently.

The first embodiment described a case in which the interlocking ring 32 is a ring, but this component may have a different shape, such as part of a ring having only the portions that achieve the function of the interlocking ring 32 and from which all other portions are removed.

In the first embodiment described above, the cam follower 32b and the follower 28a are provided near the guide bar 30A and the cam followers 35 and 45 are provided near the guide pipe 36A, but instead, at least one of these components may be arranged near the guide bar 30A or the guide pipe 36A.

Figure 8:
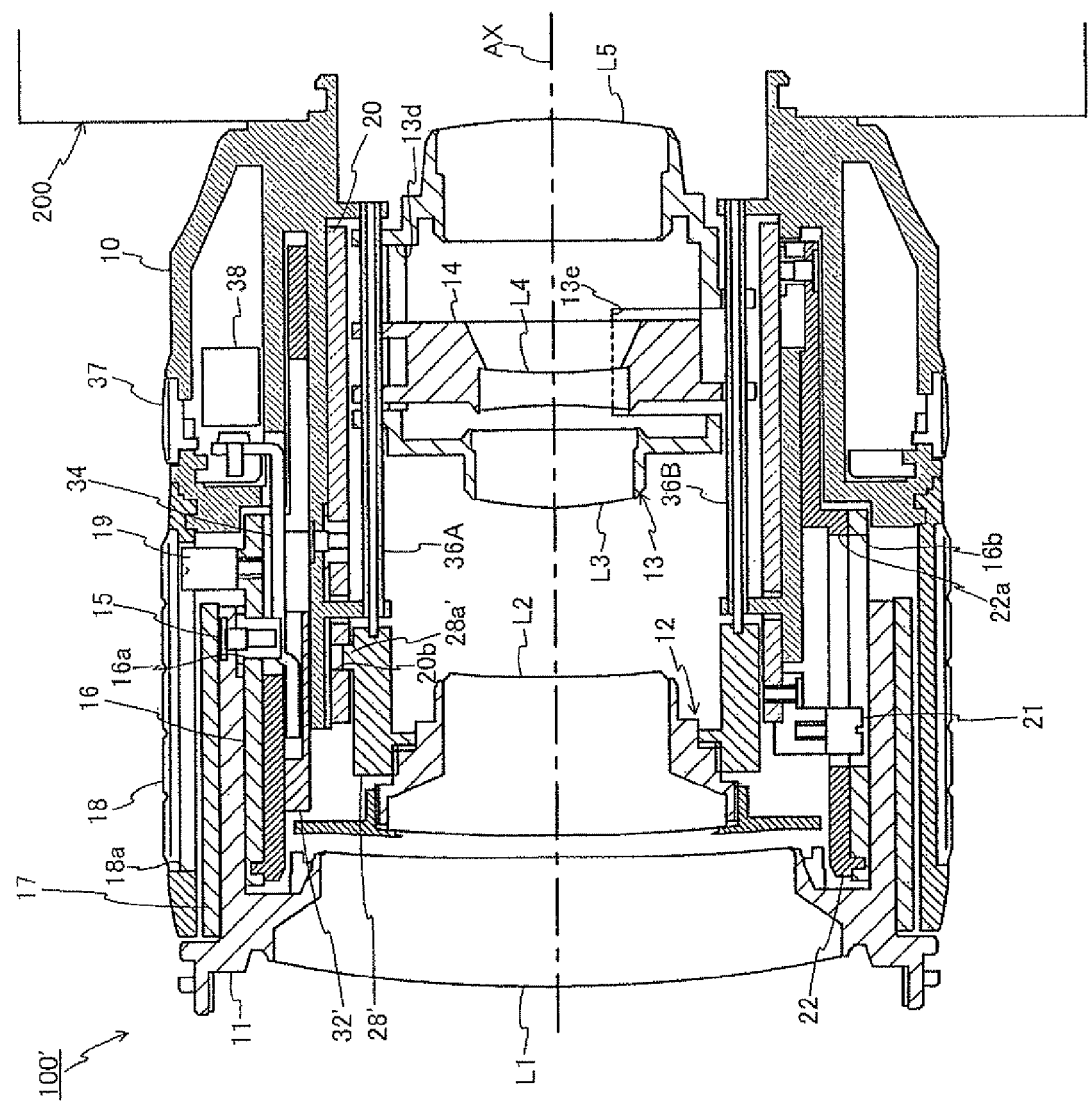
FIG. 8 is a cross-sectional view of the lens barrel according to a second embodiment in a wide angle state.
Figure 9:
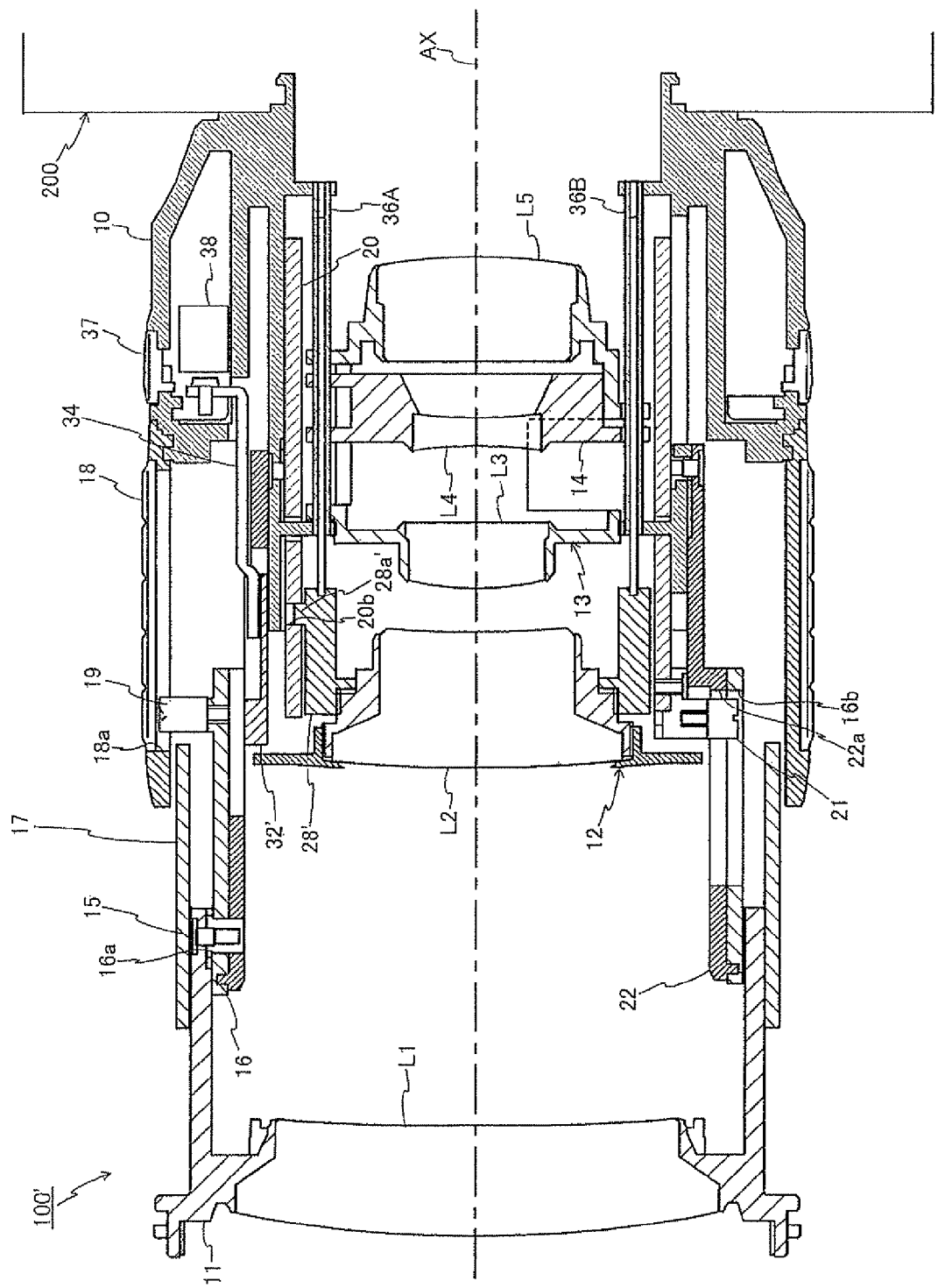
FIG. 9 is a cross-sectional view of the lens barrel according to the second embodiment in a telephoto state.

The following describes a second embodiment of the present invention with reference to FIGS. 8 and 9. FIGS. 8 and 9 show a cross-sectional view of the lens barrel 100' according to the second embodiment. FIG. 8 shows the lens barrel 100' in a wide angle state and FIG. 9 shows the lens barrel 100' zoomed to a telephoto state. The configuration of the second embodiment differs from the configuration of the lens barrel 100 in that the second lens group does move in the direction of the optical axis AX during focusing. The following description includes only points that differ from the first embodiment.

In the lens barrel 100' of the second embodiment, the engaging cylinder 28 forming the second lens group sliding cylinder 12 has a cam follower 28a, and the cam follower 28a directly engages with the cam groove 20b of the cam ring 20.

With this configuration as well, when the user rotates the zoom operation ring 18 to perform zooming, this rotation causes the cam ring 20 to rotate around the optical axis AX in the same manner as in the first embodiment. Due to this rotation, the second lens group sliding cylinder 12, i.e. the second lens group L2, the third and fifth lens group sliding cylinder 13, and the fourth lens group sliding cylinder 14, i.e. the third to fifth lens groups L3 to L5, can move in the forward and backward direction.

The second embodiment is created in consideration of a case where the second lens group is a specialized zooming lens. Accordingly, the focusing is performed by a lens other than the second lens group. A configuration that performs the focusing by moving the first lens group L1 is known as a front lens focusing type.

In the second embodiment, in the same manner as described above in the first embodiment, the guide bars 30A and 30B provided on the second lens group sliding cylinder 12 holding the second lens group L2 slide along the inner peripheral surface of the guide pipes 36A and 36B provided on the fixed cylinder 10 and extending in the direction of the optical axis AX, and the third and fifth lens group sliding cylinder 13 holding the third and fifth lens groups L3 and L5 and the fourth lens group sliding cylinder 14 holding the fourth lens group L4 slide in the direction of the optical axis AX along the outer peripheral surface of the guide pipes 36A and 3613. As a result, the lens sliding cylinders 12, 13, and 14 can move along the same components. Therefore, the configuration inside the lens barrel 100 can be simplified.

In each of the above embodiments, when focusing, some or all of the first to fifth lens groups L1 to L5 may move. A configuration in which all of the lens groups move is known as a total-focusing type.

In each of the above embodiments, the manufacturing error (gutter) of the interval between the guide bars 30A and 3013 is compensated for by having the inner diameter of the guide pip 3613 be larger than that of the guide pipe 36A, but instead, the manufacturing error (gutter) of the interval between the guide bars 30A and 30B may be compensated for by forming the outer diameter of the guide bar 3013 to be smaller than that of the guide bar 30A.

In each of the above embodiments, the guide pipes 36A and 3613 are formed separately from the fixed cylinder 10 and are supported by the fixed cylinder 10, but the configuration is not limited to this. For example, the guide pipes 36A and 36B may be formed integrally with the fixed cylinder 10.

In each of the above embodiments, the third and fifth lens groups L3 and L5 are supported by a single lens sliding cylinder 13, but instead, the third and fifth lens groups L3 and L5 may each be held by individual lens sliding cylinders, for example.

The number of lens groups and arrangement of the lens groups in the above embodiments are merely examples. Any lens barrel having at least a lens held by one lens sliding cylinder fixed to a guide bar and a lens held by another lens sliding cylinder that slides along the outer peripheral surface of a guide pipe is acceptable.

In each of the above embodiments, parts provided with male components such as the cam followers and the followers may instead be provided with female components such as the cam grooves and the circumferential grooves, and parts provided with female components such as the cam grooves and the circumferential grooves may instead be provided with male components such as the cam followers and the followers.

In the manner described above, the configuration of a lens barrel and an image capturing apparatus can be simplified. While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A lens barrel for an image capturing unit, comprising:
first and second lenses that are arranged in a fixed cylinder;

a guide that is provided in the fixed cylinder and that extends in a direction of an optical axis of the first lens;

a guide axle that slides in the direction of the optical axis along an inner peripheral surface of the guide;

a first holding component that holds the first lens and is fixed to the guide axle; and a second holding component that holds the second lens, and slides in the direction of the optical axis along an outer peripheral surface of the guide.

2. The lens barrel according to claim 1, further comprising a drive cylinder that has engaging grooves engaged directly or indirectly with the first holding component and the second holding component, and that applies a drive force in the direction of the optical axis to the first holding component and the second holding component by rotating around the optical axis.

3. The lens barrel according to claim 2, further comprising an interlocking member that is engaged with one of the engaging grooves of the drive cylinder, wherein one of the first holding component and the second holding component indirectly engages with the drive cylinder by engaging with the interlocking member, and rotation of the interlocking member around the direction of the optical axis causes a drive force in the direction of the optical axis to be applied to the holding component engaged with the interlocking member.

4. The lens barrel according to claim 2, wherein at least one of the first holding component and the second holding component has a portion thereof that is engaged with one of the engaging grooves of the drive cylinder positioned near the guide axle.

5. The lens barrel according to claim 1, wherein the first holding component is fixed to one end of the guide axle.

6. The lens barrel according to claim 1, comprising two of the guide axles and two of the guides corresponding to the two guide axles, wherein there is a difference between (i) a size of a gap between one of the guide axles and the guide corresponding to the one of the guide axles and (ii) a size of a gap between an other of the guide axles and the guide corresponding to the other of the guide axles.

7. An image capturing apparatus comprising:
the lens barrel according to claim 1; and
an image capturing unit that captures an image formed by the lens barrel.

8. The lens barrel according to claim 1, wherein the guide is cylindrical.

9. A method of manufacturing a lens barrel for an image capturing unit, the method comprising:

arranging first and second lenses in a fixed cylinder;

providing a guide in the fixed cylinder such that the guide extends in a direction of an optical axis of the first lens;

providing a guide axle in the guide such that the guide axle is slidable in the direction of the optical axis along an inner peripheral surface of the guide;

providing a first holding component for holding the first lens;

fixing the first holding component to the guide axle;

providing a second holding component for holding the second lens; and engaging the second holding component with an outer peripheral surface of the guide such that the second holding component is slidable in the direction of the optical axis along the outer peripheral surface of the guide.

10. The method according to claim 9, further comprising:
engaging grooves of a drive cylinder directly or indirectly with the first holding component and the second holding component such that the drive cylinder applies a drive force in the direction of the optical axis to the first holding component and the second holding component by rotating around the optical axis.

11. The method according to claim 10, further comprising:
engaging an interlocking member with one of the grooves of the drive cylinder, wherein one of the first holding component and the second holding component indirectly engages with the drive cylinder by engaging with the interlocking member, and rotation of the interlocking member around the direction of the optical axis causes a drive force in the direction of the optical axis to be applied to the holding component engaged with the interlocking member.

12. The method according to claim 10, wherein at least one of the first holding component and the second holding component has a portion thereof that is engaged with one of the grooves of the drive cylinder positioned near the guide axle.

13. The method according to claim 9, wherein the first holding component is fixed to one end of the guide axle.

14. The method according to claim 9, further comprising:
providing two of the guide axles and two of the guides corresponding to the two guide axles such that there is a difference between (i) a size of a gap between one of the guide axles and the guide corresponding to the one of the guide axles and (ii) a size of a gap between an other of the guide axles and the guide corresponding to the other of the guide axles.

15. A method of manufacturing an image capturing apparatus comprising:

providing the lens barrel manufactured by the method according to claim 9; and providing an image capturing unit for capturing an image formed by the lens barrel.

16. The method according to claim 9, wherein the guide is cylindrical.

* * * * *